(12) United States Patent  Yu

(10) Patent No.: US 6,561,421 B1
(45) Date of Patent: May 13, 2003

(54) UNIVERSAL SERIAL BUS CARD READER

(76) Inventor: Li-Ya Yu, P.O. Box No. 6-57, Chung-Ho, Taipei 235 (TW)

(*) Notice: Subject to any disclaimer, the term of this patent is extended or adjusted under 35 U.S.C. 154(b) by 0 days.

(21) Appl. No.: 10/014,865

(22) Filed: Dec. 14, 2001

(51) Int. Cl.⁷ .................................................. G06K 7/08
(52) U.S. Cl. ...................................... 235/451; 345/163
(58) Field of Search ........................... 235/451; 345/163

(56) References Cited
U.S. PATENT DOCUMENTS 6,307,538 B1 * 10/2001 Bacon ......................... 345/163

* cited by examiner

*Primary Examiner*—Harold I. Pitts

(57) ABSTRACT

A Universal Serial Bus (USB) card reader mainly has a long strip-shaped main body wherein an opening disposed on one of the longitudinal sides thereof; a circuit board is mounted inside the main body; a USB plug and an inserting slot corresponding to the opening of the main body are disposed on a transversely lateral side of the said circuit board; after the circuit board is secured to the main body, the said USB plug fitly projects outwardly at one end of a transverse side to allow a flash memory card to insert into the inserting slot through the longitudinal opening at 90 degree with the said USB plug so as to save the inserting space of the card reader; furthermore, when not being inserted by a flash memory card, the card reader is convenient for carrying and storage due to the reduced volume.

2 Claims, 4 Drawing Sheets

UNIVERSAL SERIAL BUS CARD READER

BACKGROUND OF THE INVENTION

1. Field of the Invention

The present invention relates to a Universal Serial Bus (USB) card reader, more especially to a card reader with smaller volume convenient for carrying and without occupying extra inserting space provided by a computer main unit when in use.

2. Description of the Prior Art

Accordingly, the common card reader applied to the flash memory card and the computer main unit, as shown in FIG. 1, has a Universal Serial Bus (USB) plug (11) disposed at one end of the main body (1); an inserting slot (12) is disposed on the opposite side of the USB plug (11); after the said USB plug (11) is inserted to connect with a computer, a flash memory card (2) is inserted through the inserting slot (12); since the said inserting slot (12) and the USB plug (11) are arranged horizontally, the volume of the entire main body (1) must be slightly larger than that of the flash memory card (2); therefore, not only the insertion and connection take space, even when not in use, the main body (1) of the card reader is not convenient for carrying or storage and that is not desirable; these shortcomings have troubled and been criticized by the industrials and the customers for a long term, so it is necessary to provide an USB card reader capable of specifically increasing the efficiency, enhancing the practical value of the related product and that is also the motive of the present invention.

SUMMARY OF THE INVENTION

Therefore, the primary objective of the present invention is to provide a Universal Serial Bus (USB) card reader to reduce the volume thereof and the space to be occupied by insertion and connection as well as to be convenient for carrying and storage when not in use.

The abovementioned card reader structure comprises a long strip-shaped main body wherein an opening disposed on one of the longitudinal sides thereof; a circuit board is mounted inside the main body; a USB plug and an inserting slot corresponding to the opening of the main body are disposed on a transverse side of the said circuit board; after the circuit board is secured to the main body, the said USB plug fitly projects outwardly from the transverse side of the main body to allow a flash memory card to insert into the inserting slot at 90 degree with the said USB plug so as to reduce the inserting space of the card reader; furthermore, when not in use, the card reader is convenient for carrying and storage.

The main body of the abovementioned card reader structure can be in the form of a long cylinder with a USB plug disposed at one end thereof; a plurality of openings can be axially arranged on the surface of the main body; a plurality of corresponding and axial inserting slots are disposed on the circuit board therein to allow flash memory cards of different functions to radially insert into different insert slots so as to increase the practical effect of the card reader; furthermore, when not in use, the volume of the card reader becomes even smaller and lighter.

To enable a further understanding of the structural features and the innovation of the present invention, the brief description of the drawings below is followed by the detailed description of the preferred embodiment.

DETAILED DESCRIPTION OF THE PREFERRED EMBODIMENTS

Figure 1:
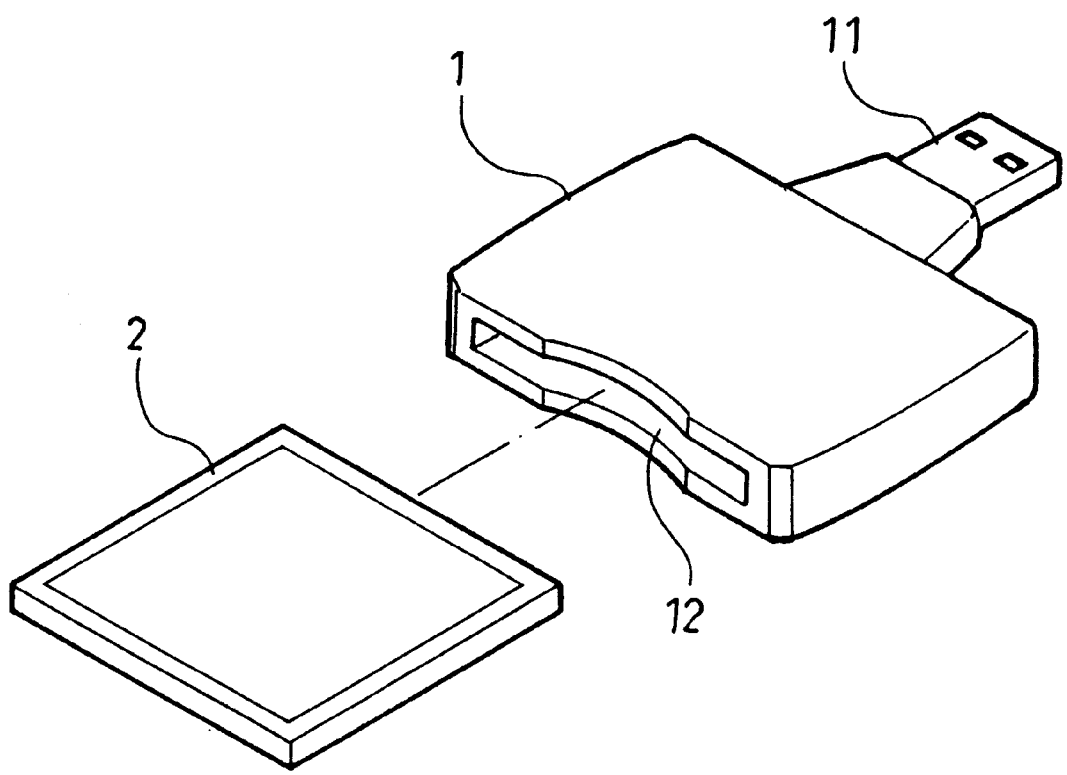
FIG. 1 is a pictorial and schematic drawing of a conventional Universal Serial Bus (USB) card reader.
Figure 2:
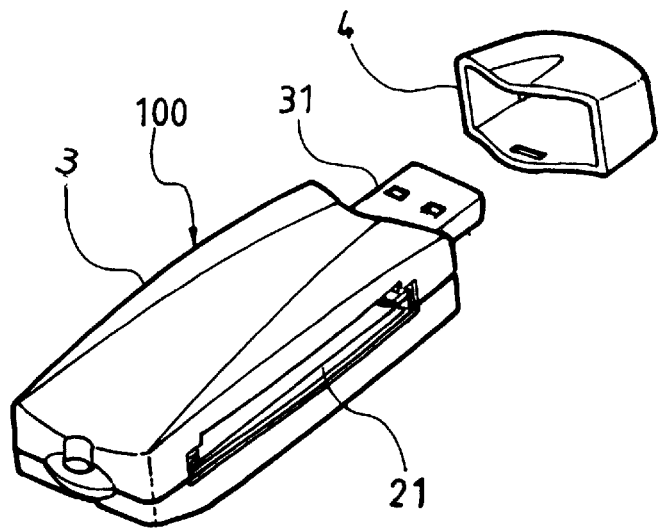
FIG. 2 is a pictorial and schematic drawing of the present invention.
Figure 3:
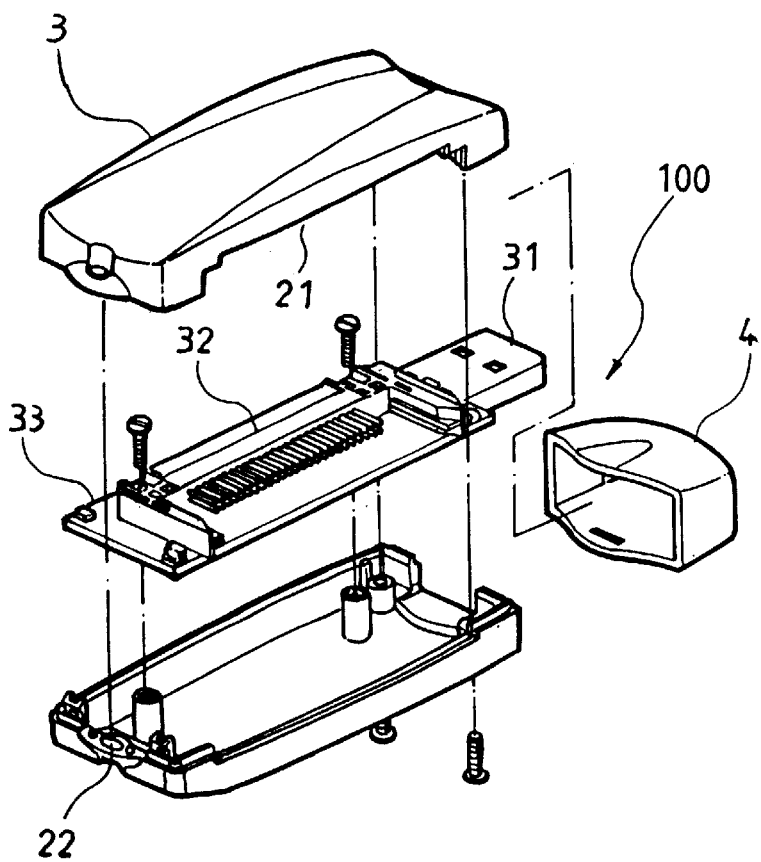
FIG. 3 is a pictorial, exploded and schematic drawing of the present invention.

Referring to FIGS. 2 and 3, the pictorial and schematic drawing as well as the pictorial, exploded and schematic drawing of the present invention, the present invention mainly comprises a long strip-shaped main body (3), an electronic circuit (33) and a cover body (4); wherein, an opening (21) is disposed on one longitudinal side of the main body (3) and a retaining ring (22) is disposed at the distal end thereof for connecting with a suspending band or a key ring.

A Universal Serial Bus (USB) plug (31) is disposed on the transverse side of the said electronic circuit (33) and an inserting slot (32) corresponding to the opening (21) of the main body (3) is disposed on the surface thereof; after the said electronic circuit (33) is mounted into the main body (3), the USB plug (31) thereof fitly projects outwardly from the front end of the main body (3) to insert into the computer; the flash memory card (2) inserts into the inserting slot (32) on the electronic circuit (33) through the opening (21) of the main body (3) to make the flash memory card (2) and the USB plug (31) stay at 90 degree so as to save the space for inserting the card reader (100); when not in use, the cover body (4) covers the entire card reader (100) to reduce the volume thereof; the retaining ring (22) connects with a suspending band or a key ring to be hung on a human body to facilitate the carrying and the storage.

Figure 4:
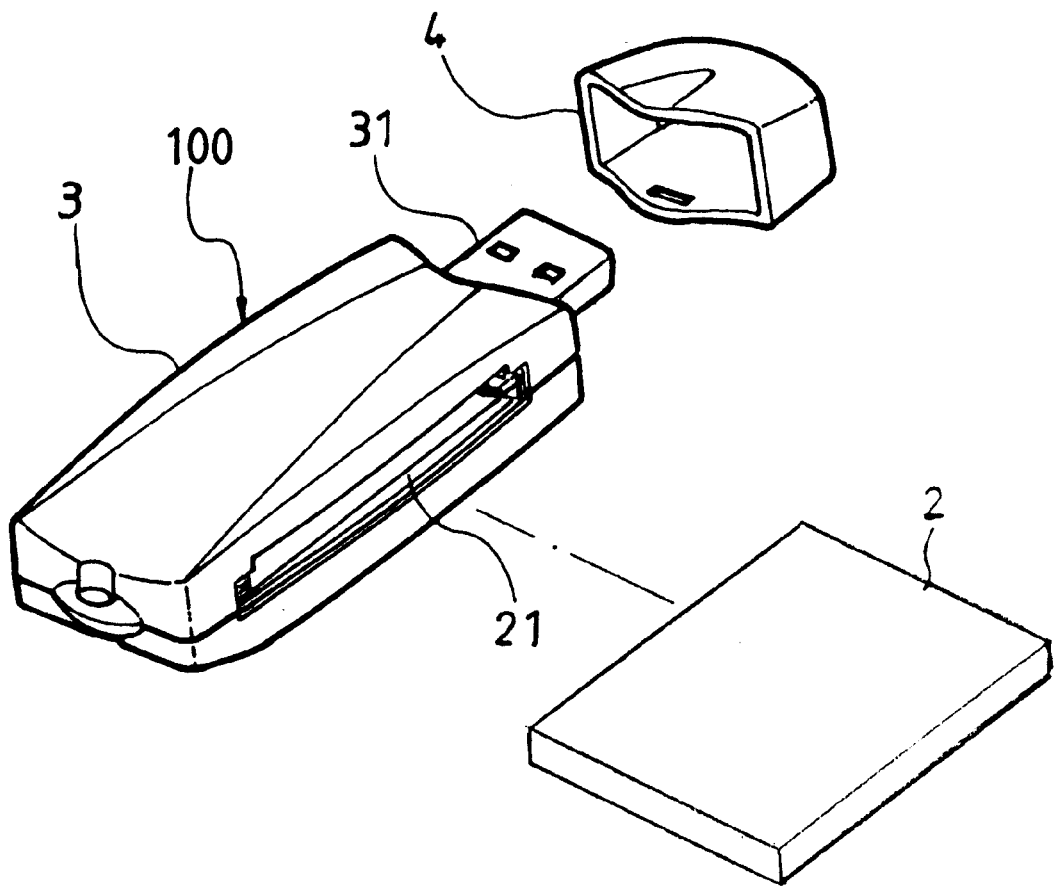
FIG. 4 is a schematic drawing of the exemplary embodiment of the application of the present invention.

Referring to FIG. 4, the schematic drawing of the exemplary embodiment of the application of the present invention, when in use, the present invention allows the flash memory card (2) to insert into the inserting slot (32) of the interior electronic circuit (33) through the opening (21) of the main body (3) so as to make the flash memory card (2) and the USB plug (31) stay at 90 degree; when the USB plug (31) is inserted into a computer, the occupied space is reduced; when the flash memory card (2) is taken out, the card reader (100) is convenient to carry due to the smaller volume of the long strip-shape.

Figure 5:
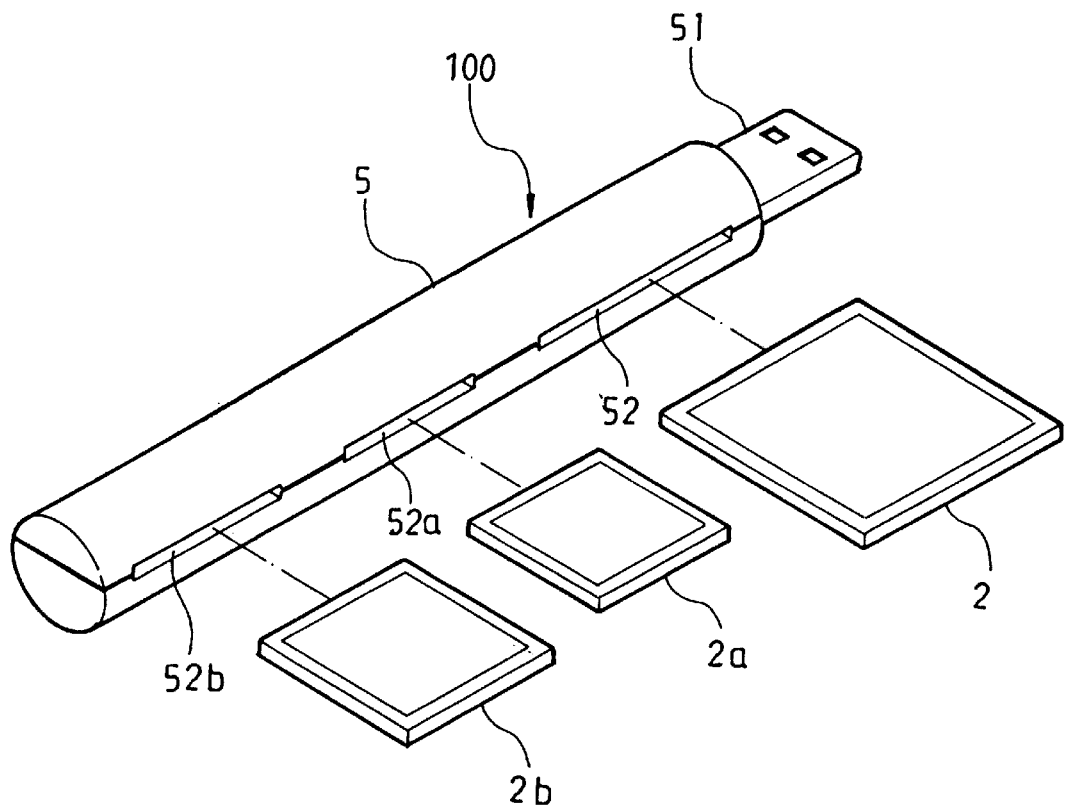
FIG. 5 is a schematic drawing of another exemplary embodiment of the present invention.

Referring to FIG. 5, the schematic drawing of another exemplary embodiment of the present invention, the card reader (100) of the present invention can be a main body (5) in the form of a long cylinder; a USB plug (51) is disposed at the front end of the main body (5); a plurality of openings (52, 52a, 52b) are disposed in an axial arrangement on the surface of the main body (5) to allow flash memory cards (2, 2a, 2b) of different functions to radially insert into different inserting slots through openings (52, 52a, 52b); when not in use, since the card reader (100) is in the shape of a pen, it is more convenient for carrying, placement and storage.

In summation of the abovementioned, the present invention of a card reader has the inserting slot and the USB plug arranged at 90 degree; when the flash memory card is not inserted for use, the volume of the card reader is substantially reduced to facilitate the carrying and storage; the present invention is indeed a practical design. It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A Universal Serial Bus (USB) card reader comprises:

a main body in the shape of a long strip with an opening disposed on the longitudinal side thereof;

an electronic circuit board mounted inside the main body with a USB plug disposed on the transverse side thereof; the said USB plug projects outwardly from one end of the main body; an inserting slot corresponding to the opening of the main body is disposed on the surface thereof to allow the flash memory card to insert into the said inserting slot at a 90 degree with the USB plug.

2. A Universal Serial Bus (USB) card reader comprises:

a main body in the shape of a long cylinder with a plurality of opening radially arranged on the surface thereof;

an electronic circuit mounted inside the main body with an USB plug disposed at one end and projecting outside the main body; a plurality of inserting slots corresponding to the openings of the main body are disposed on the surface thereof to allow flash memory cards of different functions to be radially inserted into different inserting slots.

* * * * *